United States Patent
Long, III et al.

[15] 3,635,751
[45] Jan. 18, 1972

[54] LITHIUM SILICATE GLARE-REDUCING COATING AND METHOD OF FABRICATION ON A GLASS SURFACE

[72] Inventors: George E. Long, III, Lititz; Francis D. Grove, Felton; Donald W. Bartch, Columbia, all of Pa.

[73] Assignee: RCA Corporation

[22] Filed: Apr. 3, 1969

[21] Appl. No.: 813,043

[52] U.S. Cl. .................. 117/94, 117/33.3, 117/33.5 C, 117/37 R, 117/54, 117/104 R, 117/119.6, 117/123 A, 117/159, 117/169 A, 161/116, 313/65 T, 252/313 S
[51] Int. Cl. .................................... B44d 1/46, B44d 1/08
[58] Field of Search .............. 117/69, 33.5 C, 35, 33.3, 94; 313/65 T; 23/110; 161/116; 252/313 S

[56] References Cited

UNITED STATES PATENTS

| | | | |
|---|---|---|---|
| 3,114,668 | 12/1963 | Guiles | 161/116 |
| 3,326,715 | 6/1967 | Twells | 117/33.3 X |
| 3,459,500 | 8/1969 | Segura et al. | 23/110 |

FOREIGN PATENTS OR APPLICATIONS

| | | |
|---|---|---|
| 987,657 | | Great Britain .............. 313/65 |

*Primary Examiner*—Alfred L. Leavitt
*Assistant Examiner*—Edward G. Whitby
*Attorney*—Glenn H. Bruestle

[57] ABSTRACT

A novel optical screen comprises, as its viewing surface, a hard, abrasion-resistant coating having a rough, glare-reducing surface and composed of a lithium silicate material. The screen may be prepared by a novel method comprising: (a) warming the surface of a glass support to about 30° to 100° C., (b) coating the warm surface with an aqueous solution containing about 1 to 10 weight percent of a lithium-stabilized silica sol, (c) drying the coating, and then (d) heating the dry coating at about 150° C. to 450° C.

7 Claims, 3 Drawing Figures

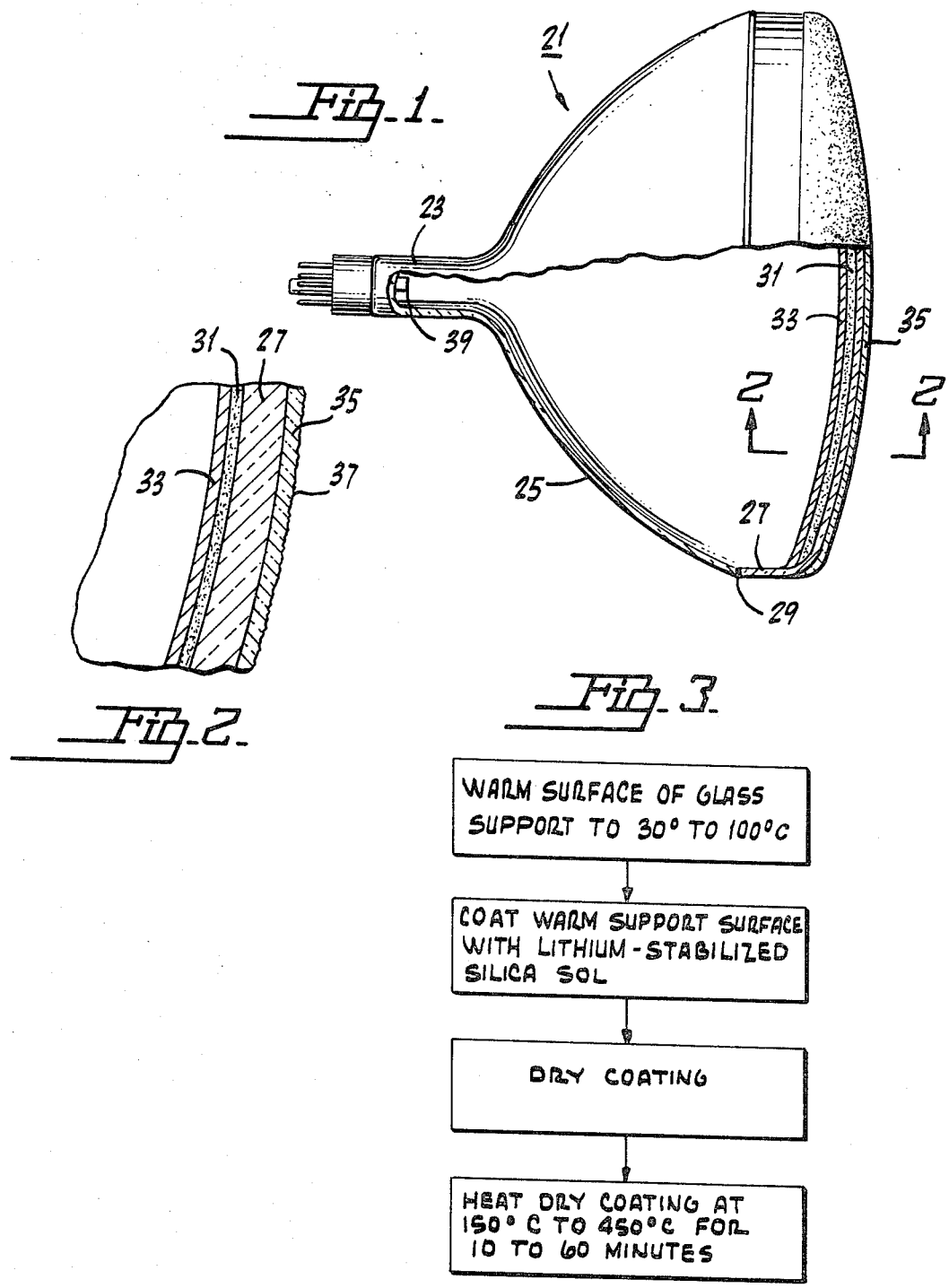

LITHIUM SILICATE GLARE-REDUCING COATING AND METHOD OF FABRICATION ON A GLASS SURFACE

BACKGROUND OF THE INVENTION

This invention relates to a novel glare-reducing coating and to a method for making this glare-reducing coating on a glass surface.

Specular reflection or glare is the direct reflection of ambient light from a smooth glass surface. Glare of light from ambient light sources interferes with the viewing of images behind the glass surface and is therefore objectionable to the viewer. In the case of a television tube, the glare of light from lamps and other light sources near the tube, especially the image of these light sources may interfere with the viewing of the picture on the tube face.

It has been suggested previously that glare may be reduced when the glass surface is coated with an alkali silicate material. See, for example, U.S. Pat. Nos. 3,114,668 to G. A. Guiles and 3,326,715 to R. G. Twells. Such coatings do not depend on destructive interference of the ambient light because of the critical thickness of the coating. Instead, the surfaces of these coatings have a controlled roughness so that the ambient light is scattered. This roughness should not unduly degrade the resolution of the image to be viewed. Also, at least for practical use on television picture tubes, the glare-reducing coating should be adherent to the glass surface and be adequately hard, abrasion resistant and chemically stable to moisture and humidity.

The term "glare-reducing" as used herein is the reduction in brightness and resolution of the reflected image of an ambient light source. Ideally, the reflected image is dissipated without affecting the rest of the viewing area of the television tube. For example, an ambient light source, such as an electric light, produces a bright reflected image of the source on the face of the tube at the viewing angle of the source. A glare-reducing coating reduces the brightness and/or the resolution of this reflected image.

Although the prior art speaks of using a glare-reducing coating of an alkali silicate material, a coating of a lithium silicate material, which is an alkali silicate, is not exemplified. It is believed that a lithium silicate glare-reducing coating is difficult to make by previous processes, which would require the use of a lithium silicate compound similar to sodium silicate or potassium silicate. Such a lithium silicate is not known. In fact, unlike sodium and potassium silicates, the known lithium silicates are substantially insoluble in cold water and decompose in hot water.

The prior art of producing a glare-reducing coating with sodium or potassium silicates deals with the problem of rendering these coatings resistant to humidity. Special processing, such as heat treatment above 500° C., or neutralization or removal of the free alkali, or both, is essential to produce a long-term stable coating. Temperatures above 500° C. may cause permanent distortion of television tube faceplate panels. Hence, prior art processes are applied almost exclusively to implosion panels which are adhered to faceplate panels of the television picture tube. Processes for neutralizing and for removing free alkali require additional expense, effort, time and equipment and are therefore undesirable.

SUMMARY OF THE INVENTION

The novel optical screen comprises, as its viewing surface, a coating having a rough surface and composed of a lithium silicate material. The novel method for producing this screen includes the steps of:

a. warming the surface of a glass support to about 30° to 100° C.,
b. coating the warm surface with an aqueous solution containing about 1 to 10 weight percent of a lithium-stabilized silica sol, the sol having an $SiO_2: Li_2O$ ratio of about 4:1 to 25:1,
c. drying the coating,
d. and then heating the dry coating at about 150° C. to 450° C. for about 10 to 60 minutes.

By using a lithium-stabilized silica sol in the foregoing method, it is now feasible to prepare a lithium silicate glare-reducing coating for a glass surface. The coating, when applied to the external surface of the face of a television tube, provides satisfactory glare reduction without unduly interfering with the color or resolution of the television picture. The coating is hard, abrasion-resistant, adherent to glass surfaces, and chemically stable to moisture and humidity. In addition, the coating may be made without special processing such as neutralization or removal of free alkali. Also, heating at temperatures above 500° C., which is above the deformation temperature of the faceplate of a television picture tube, is avoided. Thus, the coating may be made economically on the tube face at any stage of manufacture, even after the tube has been evacuated and sealed.

BRIEF DESCRIPTION OF THE DRAWING

FIG. 1 is a partially broken away longitudinal view of a cathode ray tube including the novel viewing screen of the invention.

FIG. 2 is an enlarged sectional view through a fragment of the faceplate of the tube illustrated in FIG. 1 along section lines 2—2.

FIG. 3 is a flow chart diagram of the novel process of the invention.

DESCRIPTION OF THE PREFERRED EMBODIMENTS

The cathode-ray tube illustrated in FIG. 1 includes an evacuated envelope, designated generally by the numeral 21, which includes a neck section 23 integral with a funnel section 25 and a faceplate or panel 27 joined to the funnel section 25 by a seal 29, preferably of a devitrified glass. A luminescent coating 31 of a phosphor material is applied to the interior surface of the faceplate 27. A light-reflecting coating 33, as of aluminum, is applied to the luminescent coating 31 as shown in detail in FIG. 2. The luminescent coating 31, when being suitably scanned by an electron beam from a gun 39, is capable of producing a luminescent image which may be viewed through the faceplate 27. A glare-reducing coating 35 having a rough external surface 37 and composed of a lithium silicate material is applied to the external surface of the faceplate 27. Inasmuch as the invention is concerned primarily with the faceplate 27 and the coatings thereon, the electron-emitting components and other parts normally associated with the neck and funnel portions 23 and 25 are omitted or shown schematically.

The glare-reducing coating 35 may be produced by the process shown in the flow sheet of FIG. 3. The faceplate 27 may be a separate assembly, or may be sealed to the funnel but not yet part of an evacuated tube, or may be part of a tube which has already been evacuated and sealed off at the time the glare-reducing coating is produced. Thus, one advantage of the novel coating and method is that it may be produced at any stage in the process for manufacturing the tube. Also, the glass plate may be an implosion protection plate which is to be adhered to the external surface of the faceplate 27 by a suitable adhesive.

By the novel process, a clean glass support, such as the faceplate 27, is warmed to about 30° C. to 100° C. as in an oven. The external surface of the warm plate is coated with a dilute aqueous solution of a lithium-stabilized silica sol. The coating may be applied in one or several layers by any conventional process, such as by spraying. The temperature of the plate, the specific technique for applying the coating and the number of layers applied are chosen empirically to produce a coating with the desired thickness. It has been found that, when applying the coating by spraying, the coating thickness should be such as to permit the operator to resolve the three bulbs of the reflection of a three-bulb fluorescent light fixture located about 6 feet above the glass support. A thicker initial coating results in a thicker final coating. Generally, the thicker the coating, the greater the reduction in glare and the greater the loss in resolution of the luminescent image. Conversely, the thinner the coating, the lesser the reduction in glare and the lesser the loss in resolution of the luminescent image.

Also when applied by spraying, the coating takes on an appearance of dryness. Greater dryness is achieved (1) by using higher panel temperatures while applying the coating, (2) by using more air in the spray when spraying with compressed air, (3) by using a greater spraying distance when spraying on the coating, and (4) by increasing the mole ratio of $SiO_2/Li_2O$. But, when this is overdone, the coating crazes. The greater the appearance of dryness, the greater the glare reduction and the greater the loss in resolution of the luminescent image. Conversely, the lesser the appearance of dryness, the lesser the glare reduction and the lesser the loss in resolution of the luminescent image.

The coating composition is an aqueous medium containing about 1 to 10 percent by volume of a lithium-stabilized silica sol. The ratio of $SiO_2$ to $Li_2O$ is from about 4:1 to about 25:1. The silica sol is substantially free of alkali metal ions other than lithium and is substantially free of anions other than hydroxyl. The lithium-stabilized silica sol differs substantially from a lithium silicate solution, which is a compound dissolved in a solvent and not a sol.

A stabilized sol useful in the novel method may be prepared beginning with a silica sol of conventional character. Such sols may contain particles having an average particle diameter of between about 1 and 150 millimicrons but preferably in the range of 5 to 25 millimicrons. The sol is then treated to remove substantially all alkali metal cations and all anions other than hydroxyl anions. Such removal may be achieved using ion exchange resins or by dialysis. Then, lithium hydroxide is added to the silica sol and permitted to stand overnight. A precipitate which first forms redissolves and produces a lithium-stabilized silica sol. The sols useful in the novel method should be substantially free of alkali metal cations other than lithium. It is believed that other alkali metal ions when present will displace lithium in relation to the silica particles producing essentially different results. The presence of small amounts of other alkali metal ions reduces the adherence of the coating to glass. Also, the sols used in the novel method should be essentially free of anions other than hydroxyls. Any substantial amount of sulfates, chlorides, or the like tends to produce a product of lesser stability. Some sols which may be used in the novel method are described in U.S. Pat. No. 2,668,149 issued Feb. 2, 1954 to R. K. Iler.

After coating the warm glass support, the coating is dried in air with care to avoid the deposition of lint or other foreign particles on the coating. Finally, the dry coating is heated at between 150° C. and 450° C. for 10 to 60 minutes. The optimum conditions of time and temperature are determined empirically. Generally, the higher the heating temperature, the lower will be the glare reduction in the product and the higher will be the abrasion resistance. The coating may be recycled through the heating step. Recycling at a particular temperature has the effect of reaching a stable point. The product is a glass support having a rough, glare-reducing coating. For use in TV picture tubes, the coating has the quality of glare reduction; that is, increased scattering of reflected light; and at the same time transmits the luminescent image on the phosphor coating with a resolution of at least 500 lines per inch. The glare-reducing coatings are chemically stable to manufacturing processes and to subsequent exposure to humid atmospheres. The coatings resist abrasion and exhibit substantially flat spectral responses to both reflected and transmitted light.

EXAMPLE 1

The faceplate of a 25-inch rectangular frit-sealed panel-mask-frame-funnel assembly is cleaned to remove dirt, oil, scum, etc., by any of the known scouring and washing procedures. The assembly is heated to about 80° C. for 30 minutes. Onto the warm glass surface, spray a 1 percent by volume solution of a lithium stabilized silica sol such as Lithium Polysilicate 48 marketed by E. I. du Pont de Nemours and Company, Inc., Wilmington, Del. This silica sol has a mol ratio of $SiO_2$ to $Li_2O$ of about 4.8. Using a DeVilbis No. 501 spray gun, spray at about 25 p.s.i. air pressure a wide fan spray having a high air-to-liquid ratio. Ten to 50 passes of the spray are required to build up the coating to the required thickness. The spray application is stopped about when the greatest thickness at which the reflection from the three bulbs of an ordinary three-bulb fluorescent light fixture spaced about 6 feet above the panel can still be resolved or distinguished by the operator on the coating. The coating is less than about 0.0001 inch thick. Because of the temperature of the panel, the thickness of the coating, and the high air content of the spray, the coating dries quickly after deposit. The assembly is then baked at the usual exhaust bake cycle for exhausting and sealing the tube. This includes baking for about 12 minutes above 400° C. and entails about a 60-minute period to rise to this temperature and about a 60-minute period to cool back to room temperature. The baking develops the final optical and physical properties of the glare-reducing coating. The baked coating can now withstand abrasions with a pumice slurry rubbed with an applicator applied with 15 pounds per square inch pressure. Using reflected light, about 10.65 lines per millimeter can be resolved from a picture placed on the inside face of a bare stippled panel and viewed through the panel. With an uncoated panel, about 11.96 lines per millimeter can be resolved. The coating scatters the reflected image of light sources so that the images are not distinguishable as such to the viewer. Neither the optical properties of the coating nor the abrasion resistance was degraded when the panel was exposed for 18 hours in a 100° F., 95 percent relative humidity atmosphere.

EXAMPLE 2

The glass surface of a faceplate to be coated is scrubbed with a commercial scouring compound, such as Bon Ami, rinsed with warm (120° F.) deionized water, followed by a swab with a 2 percent ammonium bifluoride solution, and again rinsed with warm (120° F.) deionized water. The glass is allowed to drip dry, and care is taken to prevent airborne dirt and oils from contaminating the glare surface. After drying, the glass is placed into a forced hot air oven and the glass is warmed to about 50° C. The glass surface is then sprayed with a 3 percent by volume solution of Lithium Polysilicate 48. The spray is relatively dry being applied from a distance of about 12 inches using an air pressure of about 25 p.s.i.. After spraying, the coated glass is heated for about 1 hour at 450° C. The resultant coating has optical and physical properties very similar to the coating produced in example 1.

EXAMPLE 3

The face of an exhausted tube is scrubbed with a commercial scouring compound such as Bon Ami, rinsed with (120° F.) deionized water, followed by a swabbing with a 2 percent ammonium bifluoride solution and again rinsed with warm (120° F.) deionized water. The glass is allowed to drip dry, and care is taken to prevent airborne dirt and oils from contaminating the glass surface. After drying, the tube is placed into a forced hot air oven and the glass is warmed to about 70° C. The glass surface is then sprayed with a 3 percent water solution of a modified Lithium Polysilicate. The modified Lithium Polysilicate is prepared by reducing the $SiO_2/Li_2O$ mole ratio of commercial Lithium Polysilicate No. 48 from 4.8 to about 4.0 by adding lithium hydroxide 5 percent water solution to the Lithium Polysilicate (3 percent by volume water solution). The spray is relatively dry, being applied from a distance of about 12 inches using an air pressure of 25 p.s.i. After spraying, the tube is heated for 1 hour at 150° C. The resultant coating has optical properties similar to the coating produced in example 1. The coating is resistant to the standard humidity resistance test and withstands an abrasion resistance test of 10 pounds per square inch as outlined in example 1.

We claim:
1. An optical screen comprising, as its viewing surface, a glare-reducing coating having a rough surface and composed of a lithium silicate material.
2. The screen defined in claim 1 wherein said lithium silicate has an $SiO_2:Li_2O$ ratio of about 4:1 to 25:1.
3. A cathode-ray tube having a faceplate comprising the viewing screen defined in claim 2.
4. In a method for preparing an optical viewing screen having a glare-reducing viewing surface, the steps including
   a. warming the surface of a glass support to about 30° C. to 100° C.,
   b. coating said surface with an aqueous solution containing about 1 to 10 weight percent of a lithium-stabilized silica sol, said sol having an $SiO_2:Li_2O$ ratio of about 4:1 to 25:1,
   c. drying said coating,
   d. and then heating said dry coating at about 100° C. to 450° C. for about 10 to 60 minutes.
5. The method defined in claim 4 wherein said glass support is the faceplate of a cathode-ray tube and said surface is the external surface thereof.
6. The method defined in claim 5 wherein said steps are carried out after said cathode ray tube has been evacuated and sealed.
7. The method defined in claim 5 wherein said steps are carried out before said cathode-ray tube has been evacuated and sealed.

* * * * *